(12) United States Patent
Jin et al.

(10) Patent No.: US 12,108,233 B2
(45) Date of Patent: Oct. 1, 2024

(54) LOUDSPEAKER AND ELECTRONIC APPARATUS

(71) Applicant: BEIJING XIAOMI MOBILE SOFTWARE CO., LTD., Beijing (CN)

(72) Inventors: Xiulu Jin, Beijing (CN); Yunfeng Jiao, Beijing (CN); Ting Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 66 days.

(21) Appl. No.: 17/707,713

(22) Filed: Mar. 29, 2022

(65) Prior Publication Data

US 2023/0128831 A1  Apr. 27, 2023

(30) Foreign Application Priority Data

Oct. 26, 2021 (CN) .......................... 202111250614.1

(51) Int. Cl.
| | |
|---|---|
| H04R 9/02 | (2006.01) |
| H04R 9/04 | (2006.01) |
| H04R 9/06 | (2006.01) |
| H04R 31/00 | (2006.01) |

(52) U.S. Cl.
CPC ............... H04R 9/027 (2013.01); H04R 9/04 (2013.01); H04R 9/06 (2013.01); H04R 31/006 (2013.01); H04R 2209/022 (2013.01)

(58) Field of Classification Search
None
See application file for complete search history.

(56) References Cited

U.S. PATENT DOCUMENTS

| | | | |
|---|---|---|---|
| 2007/0237351 A1* | 10/2007 | Hyde ....................... | H04R 9/06 |
| | | | 381/397 |
| 2015/0256931 A1 | 9/2015 | Ishii | |
| 2017/0223463 A1* | 8/2017 | Salvatti .................. | H04R 9/045 |
| 2018/0109893 A1* | 4/2018 | Chu ......................... | H04R 7/16 |
| 2021/0006906 A1* | 1/2021 | Babb ....................... | H04R 9/04 |
| 2021/0289295 A1* | 9/2021 | Wei ......................... | H03G 7/002 |

FOREIGN PATENT DOCUMENTS

| | | | | |
|---|---|---|---|---|
| CN | 102561027 A | * | 7/2012 | |
| CN | 111372173 A | * | 7/2020 | ............. H04R 7/122 |
| JP | S5610796 A | | 2/1981 | |

OTHER PUBLICATIONS

European Patent Application No. 22165575.6, Search and Opinion dated Sep. 28, 2022, 13 pages.

* cited by examiner

*Primary Examiner* — Walter F Briney, III
(74) *Attorney, Agent, or Firm* — Cozen O'Connor (57) ABSTRACT

A loudspeaker includes: a magnetic circuit assembly with a magnetic flux space; a vibrating diaphragm covering a first end of the magnetic flux space; and a voice coil assembly in the magnetic flux space and coupled to a side of the vibrating diaphragm facing the magnetic flux space. The voice coil assembly includes at least one group of conductive coils and a heat accumulator in thermally conductive contact with the at least one group of conductive coils, and the heat accumulator absorbs and accumulates heat when a temperature of the voice coil assembly reaches a target temperature.

16 Claims, 4 Drawing Sheets

LOUDSPEAKER AND ELECTRONIC APPARATUS

CROSS-REFERENCE TO RELATED APPLICATIONS

The present disclosure claims benefit of and priority to Chinese Patent Application Serial No. 202111250614.1, filed on Oct. 26, 2021, the entire contents of which are incorporated herein by reference.

TECHNICAL FIELD

The present disclosure relates to the field of electronic devices and, more particularly, to a loudspeaker and an electronic apparatus.

BACKGROUND

With the widespread use of electronic devices in many different situations and environments, a loudspeaker for an electronic device needs to meet increasingly high-performance requirements, which increases the amplitude and power of the loudspeaker. As a result, the temperature of the loudspeakers tends to increase, and the temperature has become a limitation on the performance improvement of loudspeakers. Improving the heat resistance of the loudspeakers has become a technical problem to be solved in the art.

SUMMARY

A loudspeaker includes: a magnetic circuit assembly with a magnetic flux space; a vibrating diaphragm covering a first end of the magnetic flux space; and a voice coil assembly in the magnetic flux space and coupled to a side of the vibrating diaphragm facing the magnetic flux space. The voice coil assembly includes at least one group of conductive coils and a heat accumulator in thermally conductive contact with the at least one group of conductive coils, and the heat accumulator absorbs and accumulates heat when a temperature of the voice coil assembly reaches a target temperature.

An electronic apparatus includes an audio playback device; and a loudspeaker electrically coupled to the audio playback device and converting an electrical signal output from the audio playback device into an acoustic signal. The loudspeaker includes: a magnetic circuit assembly with a magnetic flux space; a vibrating diaphragm covering a first end of the magnetic flux space; and a voice coil assembly in the magnetic flux space and coupled to a side of the vibrating diaphragm facing the magnetic flux space. The voice coil assembly includes at least one group of conductive coils and a heat accumulator in thermally conductive contact with the at least one group of conductive coils, and the heat accumulator absorbs and accumulates heat when a temperature of the voice coil assembly reaches a target temperature.

BRIEF DESCRIPTION OF DRAWINGS

In order to illustrate the technical solutions in embodiments of the present disclosure more clearly, the accompanying drawings used in the description of the embodiments will be described briefly. The accompanying drawings described below merely show some of the embodiments of the present disclosure, and other drawings can be obtained by those skilled in the art based on these accompanying drawings, without involving any inventive work.

DETAILED DESCRIPTION OF EMBODIMENTS

Embodiments will be described in detail, with examples of the embodiments illustrated in the accompanying drawings. The following description refers to the accompanying drawings in which the same numbers in different drawings represent the same or similar elements unless otherwise indicated. The implementations set forth in the following description of embodiments do not represent all implementations consistent with the present disclosure. Instead, they are merely examples of devices and methods consistent with some aspects of the present disclosure as recited in the appended claims.

It should be understood that orientation terms used in the embodiments of the present disclosure, such as "upper," "lower," "top," "bottom," "front," "rear," and "lateral" are with respect to a sound output direction of a loudspeaker. The sound output direction is designated as "top" or "upper"; an orientation of a magnetic conductor is designated as "bottom" or "lower"; and an orientation of a part between the top and the bottom is designated as "lateral". These orientation terms used in the embodiments of the present disclosure are only intended to describe the relationship between structures more clearly rather than represent absolute orientations, and hence cannot be construed as limitation on the present disclosure.

Unless otherwise defined, all technical terms used in the embodiments of the present disclosure have the same meaning as commonly understood by those skilled in the art.

In the related art, electronic devices such as cell phones usually include audio playback devices that are used to realize an audio playback function of cell phones and other electronic devices. Moving-coil loudspeakers are widely used because of their simple structure, excellent sound quality, low cost, and large dynamic range.

The moving-coil loudspeaker includes a vibration system and a magnetic circuit system. The principle of sound generation is that the magnetic circuit system of the loudspeaker constitutes an annular magnetic gap, which is filled with a uniform magnetic field. A voice coil is in the magnetic gap, and the voice coil may vibrate up and down due to an Ampere force when the voice coil is charged with current. The voice coil is coupled to a vibrating diaphragm, and as the vibration of the voice coil drives the vibrating diaphragm to vibrate, the vibration of the vibrating diaphragm drives air to vibrate, producing sound. The whole process involves conversion from electricity to force and then to sound.

In this process, the voice coil will inevitably generate a lot of heat, which may cause problems of coil burning, coil loosening, and damage to the audio playback device of the electronic apparatus, if the heat cannot be dissipated in time.

As the performance of the electronic apparatus constantly improves, the output power of the loudspeaker increases accordingly. The power increase leads to an increase in heat generated by the loudspeaker, making the heat dissipation problem of the loudspeaker more serious.

In the related art, the voice coil realizes heat dissipation mainly through air, but the heat dissipation coefficient of air is 0.023, and the heat dissipation effect is poor. In addition, the air has relatively complex composition and poor stability, which may bring certain hidden danger to the heat dissipation of the loudspeaker.

In order to improve the heat dissipation effect of the loudspeaker, graphite sheets may be placed around the loudspeaker. Although the graphite sheets have a certain effect on heat dissipation, the heat dissipation effect is unsatisfactory since the graphite sheets cannot be in direct contact with the voice coil.

Regardless of the heat dissipation through air or the heat dissipation by adding the graphite sheets, the heat dissipation targeted at the voice coil cannot be realized very well, limiting the power of the loudspeaker, affecting the sound volume and sound quality of the loudspeaker, and failing to meet users' demand for loudspeaker quality.

Therefore, the present disclosure provides a loudspeaker, in which the temperature of a voice coil assembly can be controlled below a target temperature, lowering a peak temperature of the loudspeaker, ensuring that the loudspeaker can work stably at a large amplitude and power, and improving the heat-resistant performance of the loudspeaker.

In order to clarify the purpose, technical solutions and advantages of the present disclosure, embodiments of the present disclosure will be described in further detail with reference to the accompanying drawings.

Figure 1:
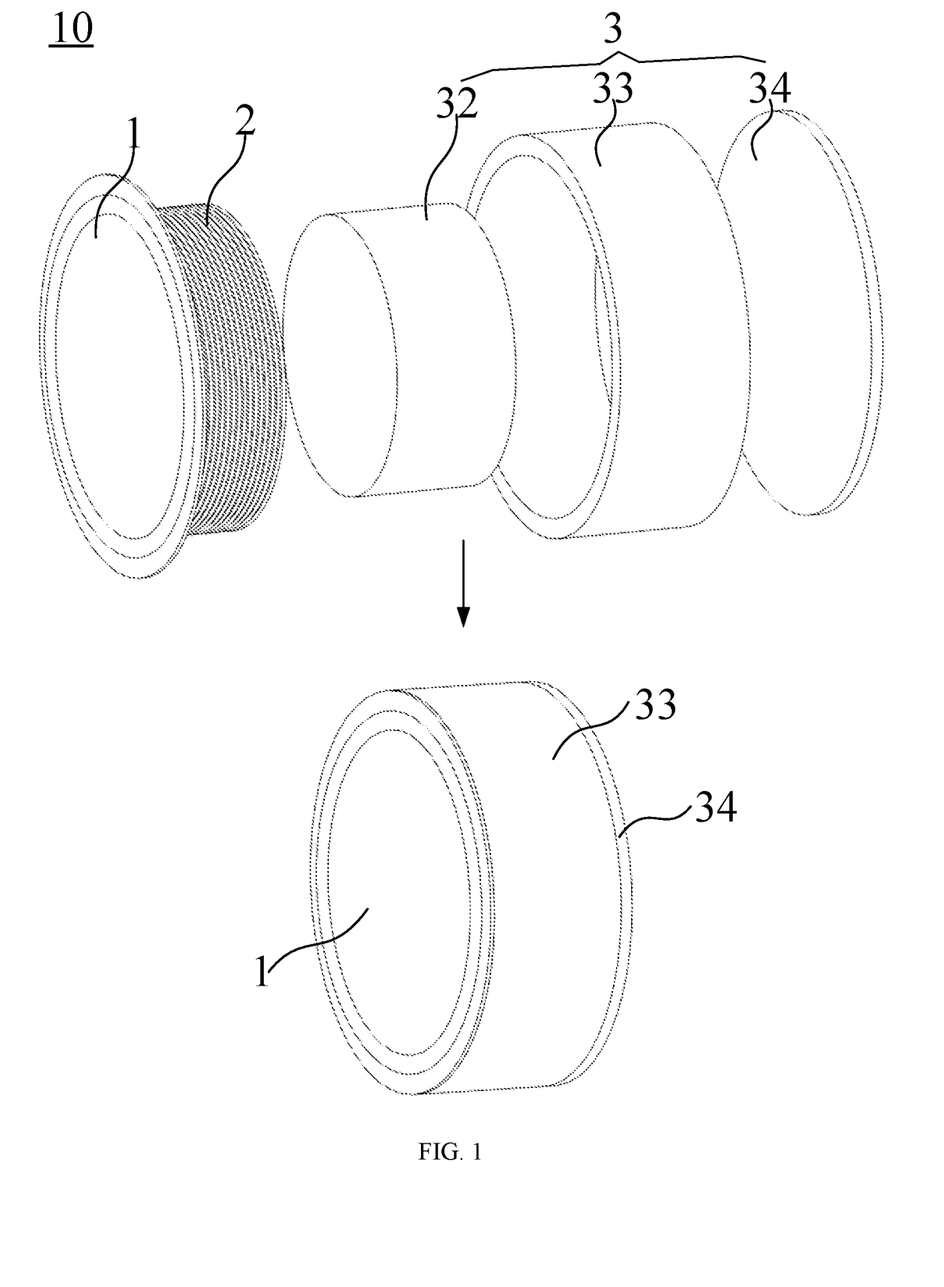
FIG. 1 is an exploded perspective view showing a loudspeaker according to an embodiment of the present disclosure.
Figure 2:
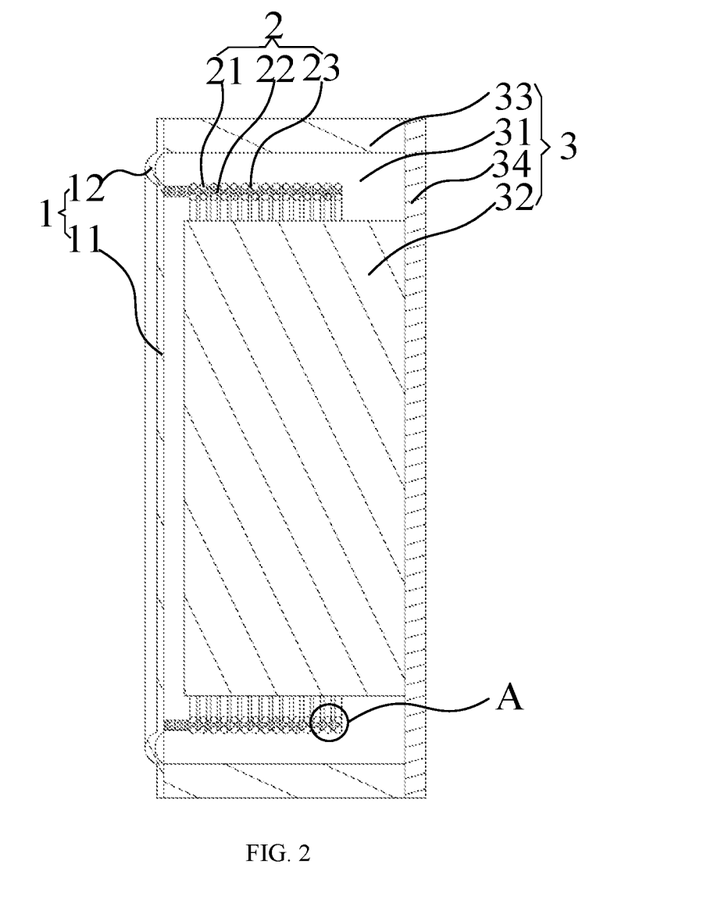
FIG. 2 is a sectional view of a loudspeaker according to an embodiment of the present disclosure.

FIG. 1 is a schematic diagram of a loudspeaker 10 according to an embodiment of the present disclosure; FIG. 2 is a sectional view of the loudspeaker 10 according to an embodiment of the present disclosure; and FIG. 3 is an enlarged view of part A in FIG. 2.

Figure 3:
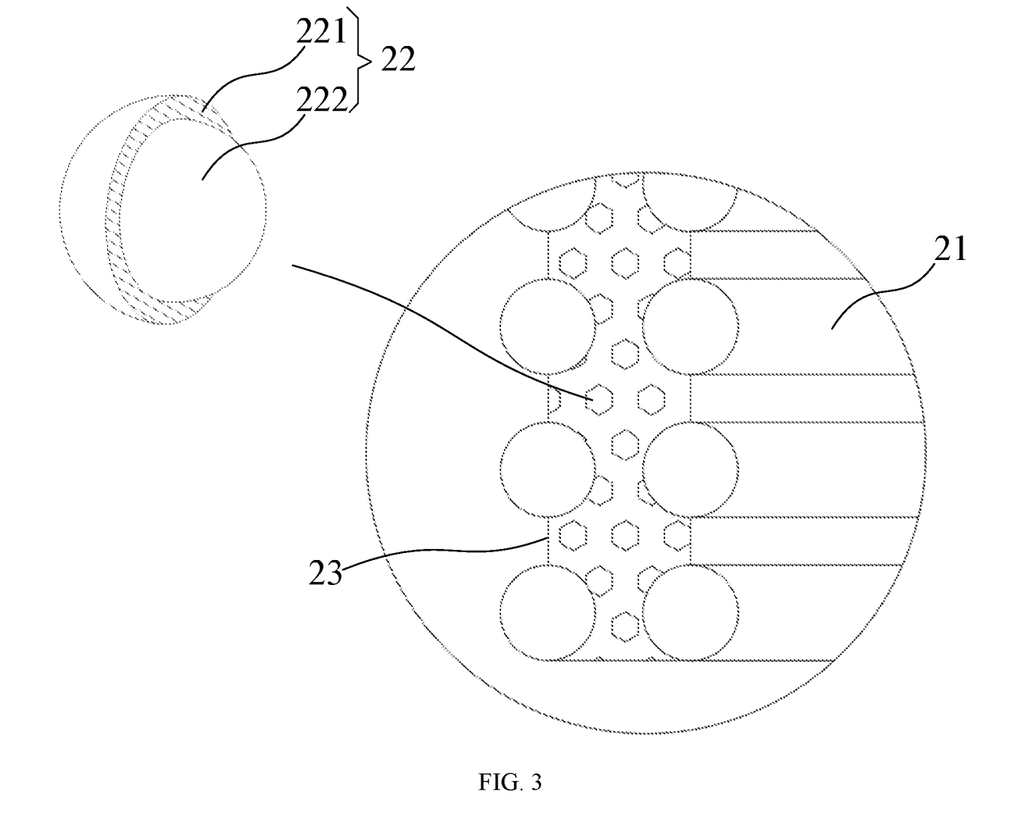
FIG. 3 is an enlarged view of part A in FIG. 2.

On the one hand, with reference to FIGS. 1-3, embodiments of the present disclosure provide the loudspeaker 10, including a vibrating diaphragm 1, a voice coil assembly 2, and a magnetic circuit assembly 3. The magnetic circuit assembly 3 has a magnetic flux space 31. The vibrating diaphragm 1 covers a first end of the magnetic flux space 31. The voice coil assembly 2 is in the magnetic flux space 31 and is coupled to a side of the vibrating diaphragm 1 facing the magnetic flux space 31. The voice coil assembly 2 includes at least one group of conductive coils 21 and a heat accumulator 22; the heat accumulator 22 is in thermally conductive contact with the at least one group of conductive coils 21; the heat accumulator 22 is configured to absorb and accumulate heat when the temperature of the voice coil assembly 2 reaches a target temperature.

The present disclosure provides the loudspeaker 10 having the heat accumulator 22 on the voice coil assembly 2 with the highest heat generation. The heat accumulator 22 and the conductive coils 21 can form a thermal conduction path. When the loudspeaker 10 works at a large amplitude and power, the conductive coils 21 will generate a large amount of heat. The temperature of the voice coil assembly 2 rises continuously, and when the temperature reaches the target temperature, the heat accumulator 22 will undergo a phase change, absorbing and accumulating a large amount of heat, so that the temperature of the voice coil assembly 2 is reduced and controlled below the target temperature, weakening the peak temperature of the loudspeaker 10, ensuring that the loudspeaker 10 can work stably at the large amplitude and power, and improving the heat resistance of the loudspeaker 10.

In some embodiments, the vibrating diaphragm 1 includes a diaphragm portion 11 and a foldable ring portion 12, and the foldable ring portion 12 is at a peripheral edge of the diaphragm portion 11. The vibrating diaphragm 1 is coupled to the first end of the magnetic flux space 31 through the foldable ring portion 12.

In some embodiments, for the diaphragm portion 11 as a sound generating element of the loudspeaker 10, the material has a great effect on the performance of the diaphragm portion 11. The diaphragm portion 11 is made of at least one of artificial materials, natural materials, and composite materials.

The artificial materials include but are not limited to: polypropylene (PP), Kevlar, carbon fiber, glass fiber and other chemical fibers, and various metals such as aluminum, beryllium, titanium, or ceramic, and diamond.

The natural materials are prepared by treating a variety of wood fibers in different ways, adding cotton or wool, and then pulping.

The composite materials include fusion of more than two kinds of materials, such as Kevlar blended with carbon fiber and artificial fibers mixed with natural fibers, and may also be made directly into a sandwich type monomer, such as an aluminum-bonded vibrating diaphragm.

In some embodiments, the foldable ring portion 12 ensures an axial movement of the diaphragm portion 11 along the loudspeaker 10 and limit a transverse movement, while serving to block air flow in front of and behind the diaphragm portion 11. In addition to the material of the diaphragm portion 11, the material of the foldable ring portion 12 may also include plastic, natural rubber and so on, which is bonded to the diaphragm portion 11 by hot pressing.

In some embodiments, the heat accumulator 22 is made of at least one of sensible heat accumulation materials, phase change heat accumulation materials, thermochemical heat accumulation materials, and adsorption heat accumulation materials. The heat accumulator 22 absorbs heat for heat storage when the surrounding temperature reaches the target temperature, and slowly releases heat when the surrounding temperature is lower than the target temperature, so that the peak temperature of the voice coil assembly 2 is equal to or lower than the target temperature, and there is no need to worry about coil burning or coil loosening due to a high temperature and other problems to protect safe operation of the loudspeaker 10.

In some embodiments, the target temperature is a safe temperature to ensure the normal operation of the loudspeaker 10, under which the loudspeaker 10 can ensure high sound quality and sound effect.

With reference to FIG. 3, in some embodiments, the heat accumulator 22 includes a phase change capsule, and the phase change capsule includes a capsule wall 221 and a core 222, in which the core 222 is made of a phase change material.

The loudspeaker 10 according to this embodiment adopts the phase change material for the heat accumulator 22, which absorbs heat and achieves heat accumulation when the phase change material changes its phase. The phase change capsule has the characteristics of large heat storage per unit mass, small temperature fluctuations (approximately isothermal during heat storage and heat release processes), good chemical stability and safety performance. The temperature of the voice coil assembly 2 can be effectively maintained below the target temperature, ensuring the safe operation of the loudspeaker 10

In addition, with the light mass and large heat storage per unit mass of the phase change capsule, the mass of the voice coil assembly 2 is slightly increased, which has a small effect on the sound generation by vibration of the voice coil assembly 2.

The phase change material (PCM), also known as a phase-change heat-accumulation material, can be subdivided into different forms based on phase change categories, such as a solid to solid phase change, a solid to liquid phase change, a liquid to gas phase change, a solid to gas phase change, and so on, in which the solid to solid phase change and the solid to liquid phase change have greater potential for application. The phase change materials may be divided into organic, inorganic and eutectic materials, such as paraffin, fatty acids, salt hydrates, etc.

For the loudspeaker 10 according to this embodiment, the temperature of the voice coil assembly 2 can be regulated in the time domain according to signal fluctuation characteristics when the loudspeaker 10 is working, i.e., heat storage at high temperature and heat release at low temperature. It may also be explained in such a way that when the loudspeaker 10 works at a higher amplitude and power, the heat generated exceeds the target temperature, the core 222 in the phase change capsule undergoes a forward phase change and absorbs a large amount of heat, lowering the temperature of the voice coil assembly 2, and weakening the peak temperature of the voice coil assembly 2; and when the loudspeaker 10 works at a lower amplitude and power, the heat generated is less, the core 222 in the phase change capsule undergoes a reverse phase change and releases heat, which heat is eventually dissipated outward through the conductive coils 21, and the core 222 may return to a heat accumulation state and wait for the next temperature peak to absorb heat through the forward phase change.

In some embodiments, the heat accumulator 22 is coated on a surface of the at least one group of conductive coils 21 such that the heat accumulator 22 can absorb heat from the conductive coil 21 during the phase change.

In some embodiments, the phase change material includes at least one of an organic phase change material and an inorganic phase change material. In some embodiments, the core 222 is an alkane phase change material and the capsule wall 221 is a phase change microcapsule powder of highly dense resin. The core 222 has a phase change temperature point equal to the target temperature. The phase change temperature point of the phase change material is related to the material composition, and the phase change temperature point can be reasonably regulated by adjusting the material composition according to actual needs.

In some embodiments, the heat accumulator 22 has a diameter ranging from 10 μm to 300 μm. When the diameter of the heat accumulator 22 is within this range, it can ensure that the heat accumulator 22 has good heat storage performance and does not affect the structure and vibration characteristics of original components (e.g., the conductive coils 21) of the voice coil assembly 2.

In some embodiments, the target temperature ranges from 40° C. to 90° C. This temperature range can ensure that the loudspeaker 10 safely and efficiently convert an electrical signal output from the audio playback device into an acoustic signal, and the loudspeaker 10 works properly in a high-performance state.

With reference to FIGS. 2 and 3, in some embodiments, the voice coil assembly 2 also includes a wire fixing body, and the heat accumulator 22 is on the wire fixing body. The wire fixing body includes at least one of an adhesive body and a winding support, to allow the heat accumulator 22 to be formed on the conductive coil 21. For the loudspeaker in this embodiment, the vibrating diaphragm 1 is driven to vibrate and generate sound regularly by the Ampere force received by the conductive coils 21 in the magnetic field. Therefore, the conductive coils 21 and the vibrating diaphragm 1 need to be reliably coupled together. The use of the wire fixing body can achieve a reliable connection between the conductive coils 21 and the vibrating diaphragm 1 and avoid detachment of the conductive coil 21 from the vibrating diaphragm 1, which may otherwise cause failure of sound generation. On this basis, the heat accumulator 22 is integrated on the wire fixing body, which can solve the problem of fixing the conductive coil 21 and the problem of coupling the heat accumulator 22 and the conductive coil 21.

With reference to FIGS. 2 and 3, in some embodiments, the voice coil assembly 2 further includes an adhesive body 23. At least one group of conductive coils 21 is bonded to the adhesive body 23, and the heat accumulators 22 are scattered within the adhesive body 23.

In the loudspeaker 10 according to this embodiment, the adhesive body 23 is within the voice coil assembly 2 and is coupled to the conductive coils 21, and the heat accumulators 22 are distributed within the adhesive body 23. The adhesive body 23 can transfer heat generated by the conductive coils 21 as much as possible to the heat accumulators 22. The heat accumulators 22 are scattered within the adhesive body 23 and can be effectively supported and fixed. Moreover, each heat accumulator 22 can absorb or release heat through its own entire surface by being wrapped by the adhesive body 23. In addition, the adhesive body 23 can also support and fix the conductive coils 21 to prevent them from separating from the vibrating diaphragm 1 during frequent vibrations.

In some embodiments, the adhesive body 23 includes a thermally conductive adhesive, which is also known as thermally conductive silicone, thermally conductive silicone rubber, thermally conductive silica gel, thermally conductive silicon or so on. The thermally conductive adhesive is silicone formed by mixing organic silicone as a main body with fillers, thermal conductive materials and other polymer materials which are added into the main body, and has better thermal conductivity and electrical insulation properties. In some embodiments, the thermal conductivity of the thermally conductive adhesive after curing ranges from 1.1 W/(m-k) to 1.5 W/(m-k), which can provide the loudspeaker 10 with high heat dissipation performance.

In addition, the thermally conductive adhesive has excellent adhesive strength and good adhesion to the conductive coils 21 and the vibrating diaphragm 1, and can provide excellent bonding and thermal conductivity.

In some embodiments, the adhesive body 23 includes a UV-curable adhesive. The UV-curable adhesive is also called a UV (Ultraviolet Rays) adhesive. A photoinitiator (or photosensitizer) in the UV adhesive absorbs UV light and produces active free radicals or cations, which trigger monomer polymerization, cross-linking and grafting chemical reactions, allowing the adhesive to convert from liquid to solid in seconds, with fast curing, no pollution and high adhesive strength.

It should be noted that in the present disclosure, unless specified or limited otherwise, terms "mounted," "connected," "coupled" and the like are used broadly, and may be, for example, fixed connections, detachable connections, or integral connections; may also be mechanical connections; may also be direct connections or indirect connections via intervening structures; may also be inner communication or mutual interaction of two elements, which can be understood by those skilled in the art according to specific situations.

With reference to FIGS. 2 and 3, in some embodiments, there are at least two groups of conductive coils 21 that are coaxially stacked and wound, and the adhesive body 23 is between two adjacent groups of conductive coils 21.

For the loudspeaker 10 according to this embodiment, in order to obtain greater magnetic flux and Ampere force in a limited space to improve the performance of the loudspeaker 10, at least two groups of conductive coils 21 are within the voice coil assembly 2. Two or more groups of conductive coils 21 are coaxially stacked and wound, and the adhesive body 23 is between two groups of conductive coils 21 that are adjacent to each other and embedded in an inner-outer direction, so that the two groups of conductive coils 21 can fixed by bonding, and heat between the two groups of conductive coils 21 can be dissipated as soon as possible.

The term "several" in the present disclosure means one or more, and terms "a plurality of" and "at least one" in the present disclosure mean two or more. The term "and/or" describes an association relationship between associated objects and represents that three relationships may exist. For example, A and/or B may represent the following three cases: only A exists, both A and B exist, and only B exists. The symbol "/" generally indicates an "or" relationship between the associated objects.

Figure 4:
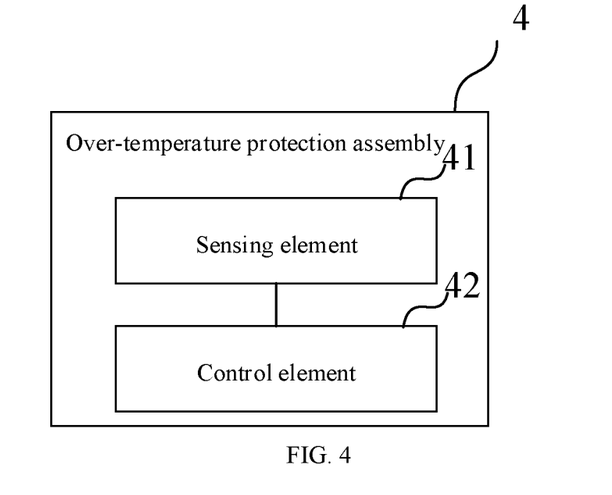
FIG. 4 is a schematic view showing an over-temperature protection assembly according to an embodiment of the present disclosure.

With reference to FIG. 4, in some embodiments, the loudspeaker 10 also includes an over-temperature protection assembly 4. The over-temperature protection assembly 4 includes a sensing element 41 and a control element 42. The sensing element 41 is used to detect the temperature of the voice coil assembly 2 and feed a detection result back to the control element 42. The control element 42 is configured to control the loudspeaker 10 to reduce the output power when the detection result exceeds a protection limit.

The loudspeaker 10 in this embodiment includes the over-temperature protection assembly 4; the over-temperature protection assembly 4 detects the temperature of the voice coil assembly 2 in real time through the sensing element 41 and feeds the detection result to the control element 42; the control element 42 in turn determines whether the temperature of the voice coil assembly 2 exceeds the protection limit, and when the temperature exceeds the protection limit, the output power of the loudspeaker 10 is forcibly reduced, making the loudspeaker 10 enter a protection mode.

In some embodiments, the protection limit is greater than the target temperature, so that in an extreme case where the heat accumulator 22 changes its phase to absorb heat but still cannot control the temperature of the voice coil assembly 2, a "fuse" protection mechanism may be implemented to prevent the temperature of the voice coil assembly 2 from further rising and damaging the structure of the loudspeaker 10.

Figure 5:
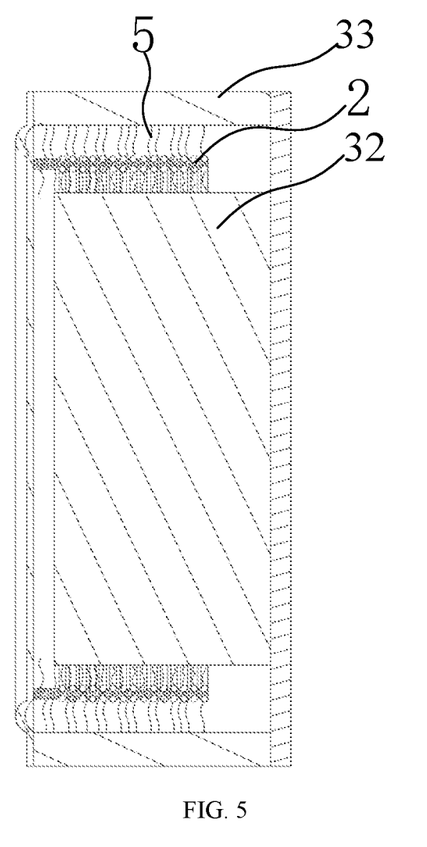
FIG. 5 is a sectional view of a loudspeaker according to another embodiment of the present disclosure.

With reference to FIG. 5, in some embodiments, the voice coil assembly 2 also includes at least one fiber body 5 on a surface of the voice coil assembly 2.

For the loudspeaker 10 of this embodiment, considering the dynamic characteristics of the moving-coil loudspeaker 10, the quality of the voice coil assembly 2 directly affects the sound quality and other properties of the loudspeaker 10, so the surface of the voice coil assembly 2 includes a lightweight fiber body 5 having a first end attached to the surface of the voice coil assembly 2 and a second end being free in the magnetic flux space 31. The fiber body 5 can swing back and forth with the axial vibration of the voice coil assembly 2. The fiber body 5 can increase a surface area of the voice coil assembly 2 and improve the heat dissipation efficiency of the voice coil assembly 2. Moreover, the fact that the fiber body 5 swings back and forth can accelerate the air circulation efficiency in the magnetic flux space 31 and further improve the heat dissipation efficiency of the voice coil assembly 2.

It can be understood that the heat accumulator 22 and the fiber body 5 in the present disclosure can be applied simultaneously or separately, both of which can improve the heat resistance of the voice coil assembly 2.

In some embodiments, the heat accumulator 22 and the fiber body 5 are applied simultaneously. When the loudspeaker 10 works at a high output power, after the temperature of the voice coil assembly 2 reaches the target temperature, the heat accumulator 22 undergoes a forward phase change and absorbs heat to maintain the temperature of the voice coil assembly 2 at or below the target temperature; when the loudspeaker 10 works at a low output power, after the temperature of the voice coil assembly 2 falls below the target temperature, the heat accumulator 22 undergoes a reverse phase change and releases heat, and the heat is transferred to the air inside the magnetic flux space 31 through the adhesive body 23, the conductive coil 21, and the fiber body 5, and is eventually dissipated outside the loudspeaker 10.

In some embodiments, at least two fiber bodies 5 are on the surface of the voice coil assembly 2 and are separately on an inner side surface and an outer side surface of opposite walls of the voice coil assembly 2 toward the magnetic flux space 31.

In some embodiments, the fiber bodies 5 are evenly distributed on the surface of the voice coil assembly 2 to ensure uniform heat dissipation of the voice coil assembly 2.

With reference to FIG. 5, in some embodiments, at least one fiber body 5 is bonded to the surface of the voice coil assembly 2. In some embodiments, at least one fiber body 5 is bonded to the surface of the voice coil assembly 2 by the thermally conductive adhesive. For example, at least one fiber body 5 is bonded to the conductive coil 21 or the adhesive body 23.

In some embodiments, at least one fiber body 5 includes thermally conductive carbon fiber. Thus, the fiber body 5 can rely on its own excellent thermal conductivity to transfer heat from the voice coil assembly 2 outwards, improving the heat dissipation performance of the voice coil assembly 2, and ensuring the working safety of the loudspeaker 10.

In some embodiments, the thermally conductive carbon fiber is a carbon fiber material with high thermal conductivity that may exceed the thermal conductivity of metallic copper in the fiber direction and be up to 700 W/mk. Such carbon fiber has good mechanical properties, electrical conductivity and excellent thermal conductivity and heat dissipation through radiation. Fibrous and highly thermally conductive carbon powder made from such carbon fiber is itself in the form of fiber and the thermal conduction orientation can be designed.

The thermally conductive carbon fiber in this embodiment has the characteristics of super high thermal conductivity, light weight, corrosion resistance, high modulus, low density, oxidation resistance, resistance to ultra-high temperature in non-oxidizing environment, repeated use, no silicone oil precipitation, dryness and non-stickiness, and easy construction, so that the thermally conductive carbon fiber is suitable for apparatus components (e.g., the loudspeaker 10) with high heat generation density and high dimensional accuracy requirements.

With reference to FIG. 5, in some embodiments, a tail end of at least one fiber body 5 is in contact with an inner wall of the magnetic flux space 31. Thus, due to the property that the thermal conduction orientation of the thermally conductive carbon fiber can be designed, the fiber body 5 is designed with thermal conductivity from the inner wall of the voice coil assembly 2 toward the magnetic flux space 31, and the inner wall of the magnetic flux space 31 is generally a magnetic material with a thermal conductivity much higher than that of air, so that the heat transfer of the voice coil assembly 2 toward the inner wall of the magnetic flux space 31 can greatly improve the ability of heat dissipation for the voice coil assembly 2, making the heat dissipation performance more excellent, and further improving the heat dissipation capability of the voice coil assembly 2.

In some embodiments, a graphite sheet or a metal sheet is on an outer wall of the magnetic circuit assembly 3 to improve the heat dissipation capability of the magnetic circuit assembly 3.

In addition, the fiber body 5 itself has low hardness and can form flexible connection between the voice coil assembly 2 and the inner wall of the magnetic flux space 31. The fiber body 5 touches the inner wall of the magnetic flux space 31 like bristles, which does not affect the vibration characteristics of the voice coil assembly 2 in the magnetic flux space 31 at all and guarantees the sound quality of the loudspeaker 10.

With reference to FIGS. 1 and 2, in some embodiments, the magnetic circuit assembly 3 includes an inner magnet 32, an outer magnet 33, and a magnetic conductor 34. The inner magnet 32 is inside the outer magnet 33, and an annular magnetic flux space 31 is formed between the inner magnet 32 and the outer magnet 33. The magnetic conductor 34 is at a second end of the magnetic flux space 31 opposite to the vibrating diaphragm 1.

For the loudspeaker 10 in this embodiment, the outer magnet 33 is constructed as an annular magnet, the inner magnet 32 is constructed as an annular magnet or a columnar magnet, and the inner magnet 32 can be accommodated in a columnar space in the middle of the outer magnet 33. The two magnets are magnetized in a radial direction. The annular magnetic flux space 31 is formed between the two magnets, and magnetic lines of force in the magnetic flux space 31 are emitted from N pole of one of the magnets and then directly enter S pole of the other magnet. The loss of magnetic lines in the space is smaller, the radiation of magnetic lines is more uniform, and the magnetic field strength is greater, so that an effective length of the voice coil assembly 2 over which the force is exerted is increased, and the Ampere force driving the vibrating diaphragm 1 is also increased. As a result, the ability of the vibrating diaphragm 1 to squeeze the air is enhanced, indirectly improving the sound generation performance of the loudspeaker 10.

In addition, the magnetic conductor 34 in this embodiment can effectively bind the magnetic lines of force. A large number of closed magnetic lines of force are generated around the magnet, and the distribution of these magnetic lines of force in magnetically non-conductive substances (such as air) becomes sparse from a proximal side to a distal side. Since a large number of magnetic lines of force preferentially pass through a path having a magnetically conductive substance, by arranging the magnetic conductor 34 under the magnetic circuit assembly 3, the magnetic field emitted from the magnet can be largely bound in the magnetic conductor 34, which can concentrate and enhance the magnetic field, enhancing the Ampere force exerted on the vibrating diaphragm 1, and resulting in better sound quality of the loudspeaker 10.

In some embodiments, the inner magnet 32 or the outer magnet 33 is made of alloy permanent magnet materials or ferrite permanent magnet materials. The alloy permanent magnet materials include rare earth permanent magnet materials (neodymium iron boron $Nd_2Fe_{14}B$), samarium cobalt (SmCo), and aluminum nickel cobalt (AlNiCo).

The loudspeaker 10 according to the present disclosure is suitable for portable electronic devices, such as smartphones, tablet computers, MP3 players (Moving Picture Experts Group Audio Layer III), MP4 players (Moving Picture Experts Group Audio Layer IV), laptops or desktop computers, and may also be suitable for other products, such as point-of-service terminals, wearable devices, and automobiles, medical and industrial products.

Embodiments of the present disclosure provide an electronic apparatus including an audio playback device and the loudspeaker 10 according to any of the above embodiments. The loudspeaker 10 is electrically coupled to the audio playback device, and the loudspeaker 10 is used to convert an electrical signal output from the audio playback device into an acoustic signal.

The electronic apparatus according to the embodiments has the high heat resistance and good heat dissipation performance by using the loudspeaker of any one of the embodiments of the present disclosure. The temperature can be kept below the safety limit even in high power mode, and the electronic apparatus can play audio and video normally even in the high power and high temperature usage environment.

The electronic apparatus according to the embodiments includes a portable electronic apparatus, such as smart phones, tablet computers, MP3 players (Moving Picture Experts Group Audio Layer III), MP4 players (Moving Picture Experts Group Audio Layer IV), laptop or desktop computers, and also includes point-of-service terminals, wearable devices, and automobiles, medical and industrial products.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "certain embodiments," "one embodiment," "some embodiments," "an exemplary embodiment," "an example," "a specific example," or "some examples," means that a particular feature, structure, material, or characteristic described in connection with the embodiment or example is included in at least one embodiment or example of the present disclosure.

The above description merely involves embodiments of the present disclosure rather than limit the present disclosure, and any modification, alternative and variation made without departing from the principle of the present disclosure fall into the scope of the present disclosure.

What is claimed is:

1. A loudspeaker, comprising:
a magnetic circuit assembly with a magnetic flux space;
a vibrating diaphragm covering a first end of the magnetic flux space; and
a voice coil assembly in the magnetic flux space and coupled to a side of the vibrating diaphragm facing the magnetic flux space, wherein the voice coil assembly comprises at least two groups of conductive coils and a heat accumulator in thermally conductive contact with the at least two groups of conductive coils, and the heat accumulator absorbs and accumulates heat when a temperature of the voice coil assembly reaches a target temperature,
wherein the voice coil assembly further comprises a wire fixing body that is an adhesive body, and the at least two groups of conductive coils are bonded to the adhesive body;
the at least two groups of conductive coils are wound coaxially and nested in an inner-outer direction, and the adhesive body is between every two adjacent groups of conductive coils;
heat accumulators are scattered within the adhesive body; and
the voice coil assembly further comprises a lightweight fiber body, a first end of the lightweight fiber body being attached to a surface of the voice coil assembly and a second end of the lightweight fiber body being free in the magnetic flux space, and the lightweight fiber body being swingable with axial vibration of the voice coil assembly.

2. The loudspeaker according to claim 1, wherein the heat accumulator comprises a phase change capsule, and the phase change capsule comprises a capsule wall and a core, the core being made of a phase change material.

3. The loudspeaker according to claim 2, wherein the phase change material comprises at least one of an organic phase change material and an inorganic phase change material.

4. The loudspeaker according to claim 2, wherein the heat accumulator has a diameter ranging from 10 μm to 300 μm.

5. The loudspeaker according to claim 1, wherein the target temperature ranges from 40° C. to 90° C.

6. The loudspeaker according to claim 1, wherein the adhesive body comprises a thermally conductive adhesive.

7. The loudspeaker according to claim 1, further comprising an over-temperature protection assembly,
wherein the over-temperature protection assembly comprises a sensing element and a control element; the sensing element detects the temperature of the voice coil assembly and feeds a detection result back to the control element; and the control element controls the loudspeaker to reduce an output power when the detection result exceeds a protection limit.

8. The loudspeaker according to claim 1, wherein the first end of the lightweight fiber body is bonded to the surface of the voice coil assembly.

9. The loudspeaker according to claim 1, wherein the lightweight fiber body comprises thermally conductive carbon fiber.

10. The loudspeaker according to claim 1, wherein the second end of the lightweight fiber body is in contact with an inner wall of the magnetic flux space.

11. The loudspeaker according to claim 1, wherein the vibrating diaphragm comprises a diaphragm portion and a foldable ring portion at a peripheral edge of the diaphragm portion, and the vibrating diaphragm is coupled to the first end of the magnetic flux space through the foldable ring portion.

12. The loudspeaker according to claim 11, wherein the diaphragm portion is made of at least one of artificial materials, natural materials, and composite materials.

13. The loudspeaker according to claim 1, wherein the heat accumulator is coated on a surface of the at least two groups of conductive coils.

14. The loudspeaker according to claim 1, wherein a plurality of fiber bodies are evenly distributed on the surface of the voice coil assembly.

15. The loudspeaker according to claim 1, wherein:
the magnetic circuit assembly comprises an inner magnet, an outer magnet, and a magnetic conductor;
the inner magnet is inside the outer magnet, and the magnetic flux space is formed between the inner magnet and the outer magnet and is annular; and
the magnetic conductor is at a second end of the magnetic flux space opposite to the vibrating diaphragm.

16. An electronic apparatus, comprising:
an audio playback device; and
a loudspeaker electrically coupled to the audio playback device and converting an electrical signal output from the audio playback device into an acoustic signal,
wherein the loudspeaker comprises:
a magnetic circuit assembly with a magnetic flux space;
a vibrating diaphragm covering a first end of the magnetic flux space; and
a voice coil assembly in the magnetic flux space and coupled to a side of the vibrating diaphragm facing the magnetic flux space, wherein the voice coil assembly comprises at least two groups of conductive coils and a heat accumulator in thermally conductive contact with the at least two groups of conductive coils, and the heat accumulator absorbs and accumulates heat when a temperature of the voice coil assembly reaches a target temperature,
wherein the voice coil assembly further comprises a wire fixing body that is an adhesive body, and the at least two groups of conductive coils are bonded to the adhesive body;
the at least two groups of conductive coils are wound coaxially and nested in an inner-outer direction, and the adhesive body is between every two adjacent groups of conductive coils; and
heat accumulators are scattered within the adhesive body; and
the voice coil assembly further comprises a lightweight fiber body, a first end of the lightweight fiber body being attached to a surface of the voice coil assembly and a second end of the lightweight fiber body being free in the magnetic flux space, and the lightweight fiber body being swingable with axial vibration of the voice coil assembly.

* * * * *